United States Patent Office 2,741,867
Patented Apr. 17, 1956

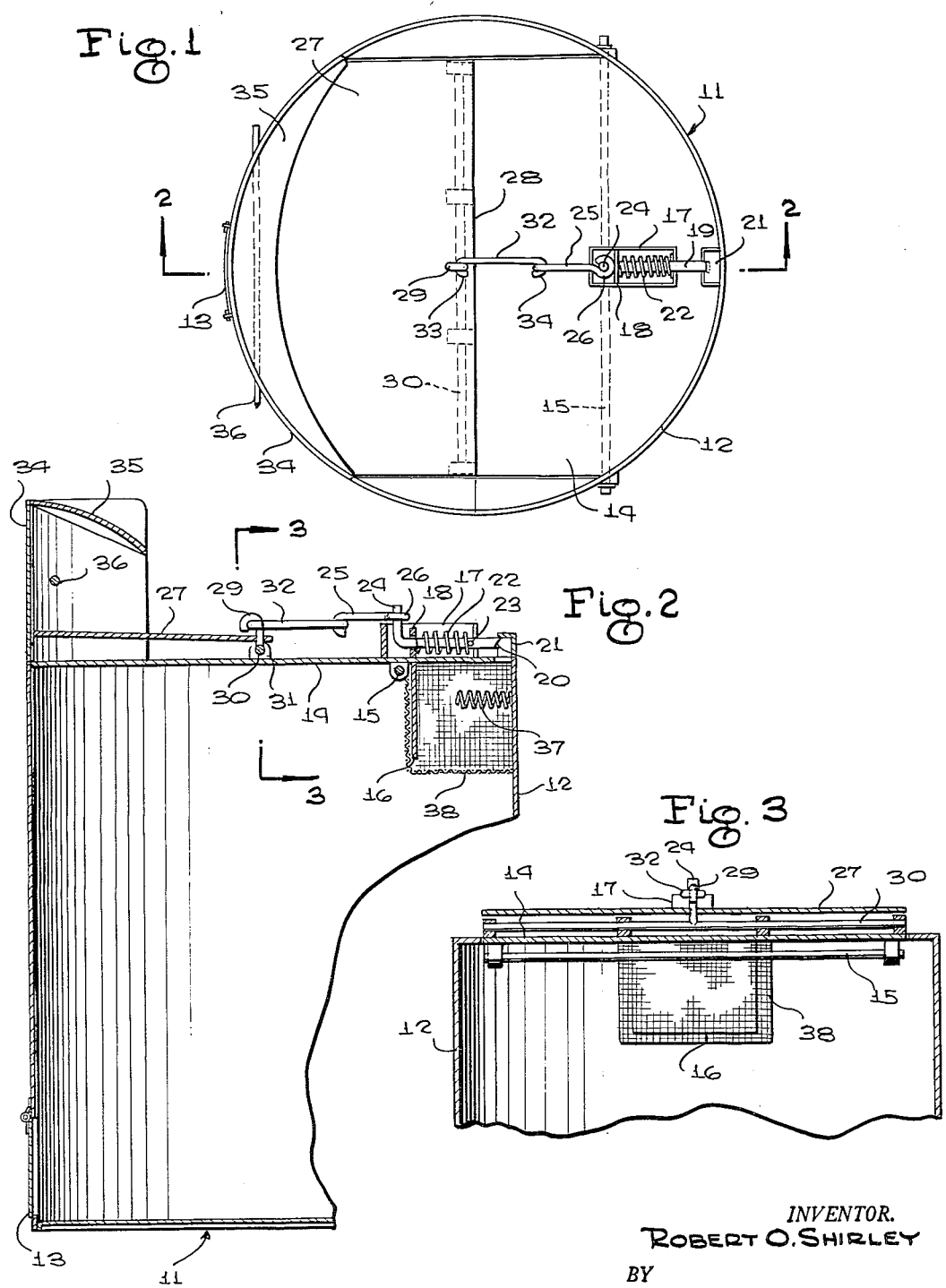

2,741,867

AUTOMATIC ANIMAL TRAP

Robert O. Shirley, Memphis, Tenn.

Application September 5, 1952, Serial No. 308,110

1 Claim. (Cl. 43—70)

This invention relates to animal traps, and more particularly to an improved device for catching small animals.

The main object of the invention is to provide a novel and improved animal trap which is simple in construction, which is automatically resettable after an animal has been caught therein, and which is reliable in operation.

A further object of the invention is to provide an improved animal trap which is inexpensive to manufacture, which is durable in construction, which requires a minimum amount of human attention, and which is easy to maintain in operating condition.

Further objects and advantages of the invention will become apparent from the following description and claim, and from the accompanying drawings, wherein:

Figure 1 is a top plan view of an improved animal trap constructed in accordance with the present invention.

Figure 2 is a fragmentary vertical cross sectional view taken on the line 2—2 of Figure 1.

Figure 3 is a fragmentary vertical cross sectional view taken on the line 3—3 of Figure 2.

Referring to the drawings, the animal trap is designated generally at 11 and comprises a housing which may have any suitable shape, the housing being shown, merely by way of example, as being cylindrical in shape and being represented by the reference numeral 12. The housing 12 is provided near its bottom wall with the hinged closure 13 for providing access to the interior of the housing, as for removing animals trapped therein.

Designated at 14 is the top wall of the housing, said top wall being mounted on a transverse shaft 15 which is rotatably supported in the upper portions of the wall of the housing, whereby the top wall 14 is pivoted for swinging movement around the shaft 15. As shown in Figures 1 and 2, the shaft 15 is offset a substantial distance from the transverse diameter of the housing, whereby the major portion of the weight of the top wall 14 is located to the left of the shaft 15, biasing the top wall 14 downwardly. To counteract the biasing effect of the major portion of the top wall 14, a depending plate member 16 of relatively heavy material is secured to the bottom surface of the top wall 14 on the right side of and adjacent to the shaft 15, as viewed in Figure 2, serving as a counterweight to maintain the top wall 14 in a substantially horizontal normal position.

Secured on the top wall 14 above the shaft 15 is a generally rectangular housing 17 which is open at its top and which is provided with the transverse partition 18. Engaging slidably through the partition 18 is a latch bolt 19 having the beveled end 20 which is lockingly engageable in an upstanding detent housing 21 rigidly secured on the rim of the housing 12 opposite the downwardly swingable major portion of top wall 14. A coiled spring 22 surrounds the bolt 19 and bears between the apertured wall 18 and a transverse pin 23 extending through the bolt, biasing the bolt to the right, as viewed in Figure 2, namely, toward locking position in the detent member 21. The latch bolt 19 is formed with the upstanding arm 24. Designated at 25 is a hook member having an eye 26 at one end thereof which engages the upstanding arm 24. Designated at 27 is a plate member which is hinged to the top cover 14, as by being rigidly secured at the mid portion of its transverse margin 28 to a hooked bolt 29, said bolt 29 being rigidly secured to the intermediate portion of a transversely extending shaft 30 which is rotatably supported in upstanding apertured lugs 31 provided on the top wall 14. As shown in Figure 1, the transverse shaft 30 extends parallel to the shaft 15 and is located a substantial distance to the left of shaft 15, as viewed in Figures 1 and 2. The hooked top portion of the member 29 is connected to the hooked member 25 by a link rod 32 having hooked end portions 33 and 34 which are respectively interlocked with the hooked ends of the members 29 and 25.

It will be readily apparent that when the plate member 27 is rotated counterclockwise, as viewed in Figure 2, the link member 32 pulls the member 25 and the bolt 19 to the left, as viewed in Figure 2, disengaging the end 20 of the latch bolt 19 from the detent member 21, thus releasing the hinged top cover 14.

Designated at 34 is an upwardly extending wall which may comprise a vertical extension of the main wall of housing 12 adjacent the free peripheral marginal portions of the top wall 14 and the member 27. Secured to the vertical extension 34 is a generally arcuately shaped inclined plate element 35. The members 34 and 35 define a generally arcuately shaped hood disposed over the free end portions of the plate member 27 and the cover 14. Secured transversely in the vertical wall extension 34 is the rod member 36 adapted to support the bait which is employed to attract an animal onto the plate member 27. The aforesaid hood structure conceals the bait from all directions except the direction from which an animal must proceed in order to enter onto the plate member 27.

In operation of the device, an animal proceeds onto the plate member 27 in attempting to obtain the bait mounted on the rod 36. The weight of the animal depresses the plate member 27, causing the latch bolt 19 to be disengaged from the detent element 21. With the latch bolt 19 disengaged from the detent element 21, the weight of the animal causes the hinged wall 14 to descend, whereby the animal is dropped into the housing 12. As the hinged top wall 14 descends, the depending, weighted plate member 16 engages a spring 37 secured to the upper portion of the wall of housing 12 opposite the depending plate member 16, as shown in Figure 2, causing the spring to be compressed. When the animal is dropped from the top wall 14 into the housing, the spring 37 cooperates with the counterweight element 16 to rotate the hinged top wall 14 clockwise toward its normal horizontal position, shown in Figure 2. The spring 37 operates to provide a rapid return of the hinged top wall 14 to its normal horizontal position, preventing escape of the animal during the movement of the hinged top wall 14 toward closing position. As wall 14 reaches its horizontal position, the beveled end 20 of the latch bolt 19 engages beneath the top flange of the detent element 21, whereby the trap is automatically reset for its next operation.

Designated at 38 is a protective screen which is provided in the upper portion of the housing 12 surrounding the space containing the spring 37 and the depending weighted member 16. The screen 38 serves to prevent animals when trapped in the housing 12 from contacting the counterweight 16 and the spring 37.

While a specific embodiment of an improved animal trap has been disclosed in the foregoing description, it will be understood that various modifications within the spirit of the invention may occur to those skilled in the art. Therefore, it is intended that no limitations be placed

What is claimed is:

An animal trap comprising: a housing including a flat, normally horizontally disposed top wall pivoted on a horizontal axis for downward swinging movement inwardly of the housing, thereby to drop into the housing an animal supported upon said top wall; a depending plate member secured to the underside of the top wall and extending downwardly in the housing in a plane normal to that of the top wall, said plate member being weighted to counterbalance the weight of the top wall for normally maintaining the top wall in its horizontal position; latch means on the top wall normally positioned to prevent said downward swinging movement of the top wall; means actuable by an animal supported upon the top wall for disengaging said latch means, thus to swing the top wall downwardly; a spring secured at one end to one wall of the housing, the other end of the spring being free, said spring being normally disposed within said housing in spaced relation to said plate member in the normal position of the top wall, the spring extending transversely across the path described by one edge portion of said plate member when the plate member is swingably moved together with the top wall under the weight of a supported animal, with said spring engaging said edge portion of the plate member adjacent the free end of the spring, the spring being compressed by the plate member so as to place the spring under tension, thereby to accelerate the return movement of the plate member and top wall to their normal positions after dropping of the animal off said top wall, and a protective screen enclosure secured within the housing in a stationary position adjacent the pivot axis of the top wall, said enclosure extending about the spring and plate member and being positioned in close proximity to the plate member when said plate member is in its normal position, thereby to prevent movement of the plate member away from said normal position by an animal confined within the trap.

References Cited in the file of this patent

UNITED STATES PATENTS

| Number | Name | Date |
|---|---|---|
| 32,434 | Quigley | May 28, 1861 |
| 70,134 | Treritt | Oct. 22, 1867 |
| 510,836 | Carpenter | Dec. 12, 1893 |
| 765,869 | Wynne | July 26, 1904 |
| 1,204,472 | Mills | Nov. 14, 1916 |
| 1,463,874 | Croyle | Aug. 7, 1923 |
| 1,537,763 | Gianoli | May 12, 1925 |
| 1,542,673 | Dale | June 16, 1925 |
| 1,914,972 | Judge | June 20, 1933 |